Nov. 10, 1964   M. H. ANDERSON, JR., ETAL   3,156,193
CONVEYOR SYSTEM
Filed Oct. 12, 1962   3 Sheets-Sheet 1
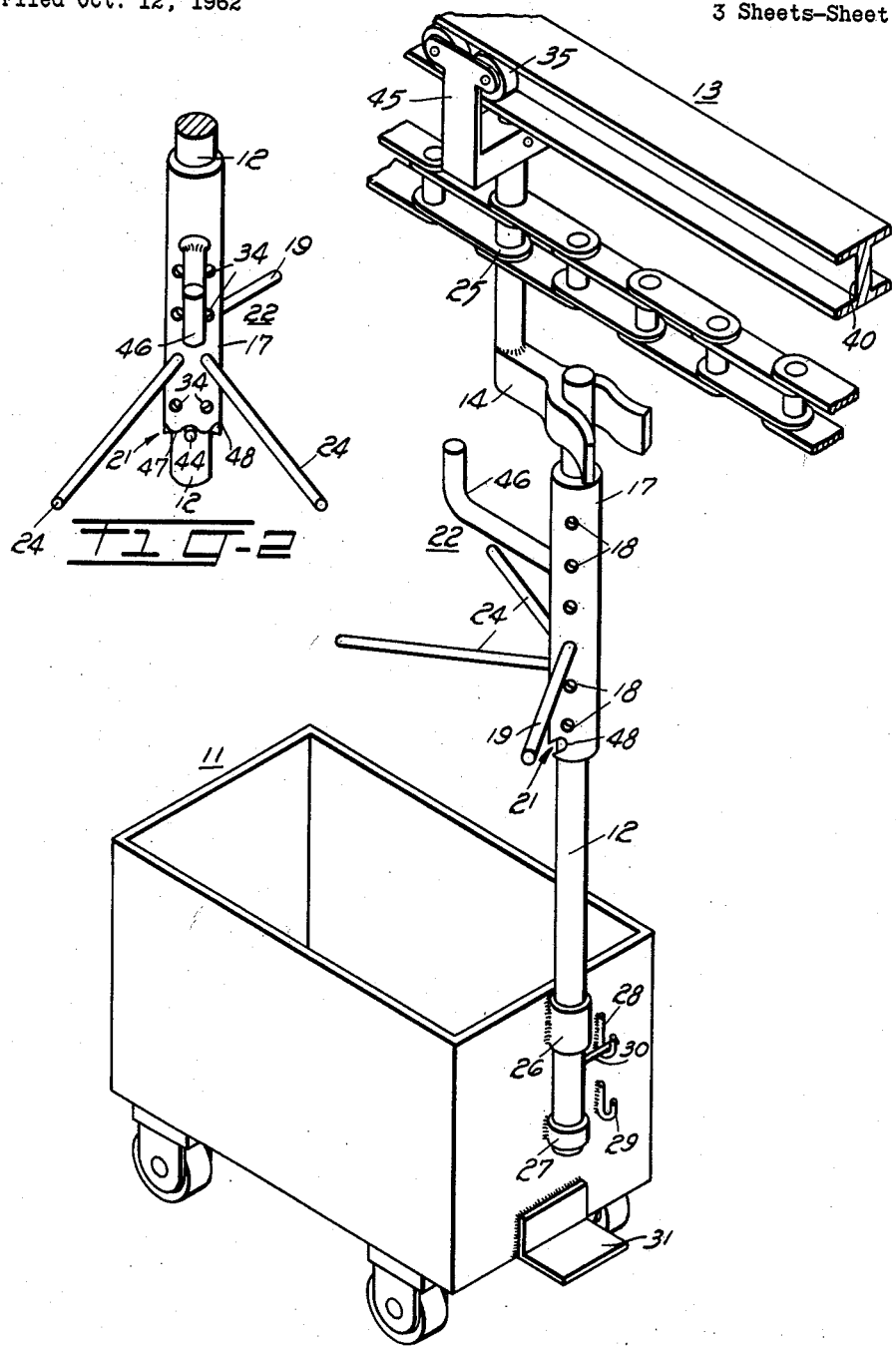
INVENTORS
M.H. ANDERSON JR.
R. MITTERMANN
BY
ATTORNEY

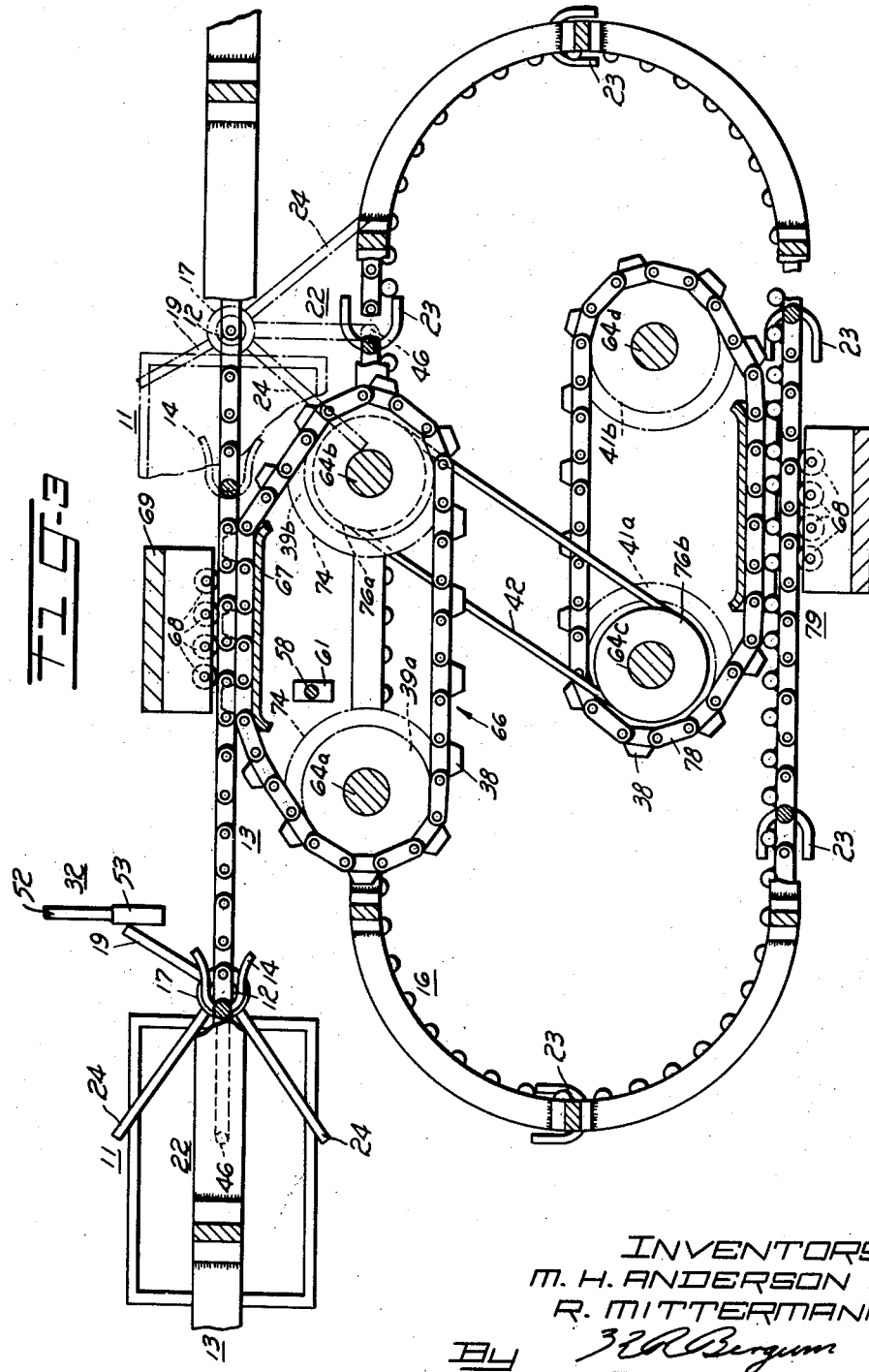

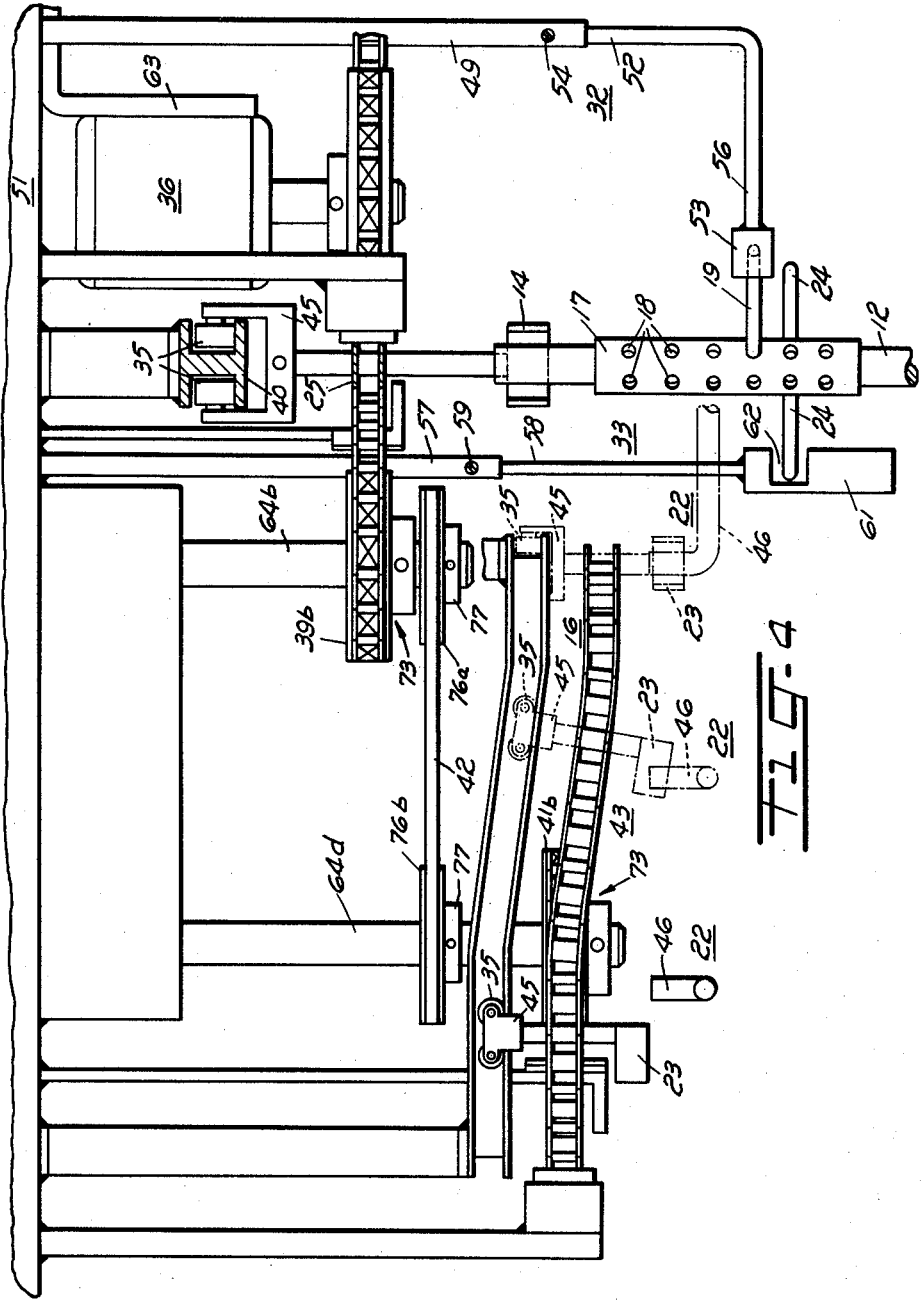

3,156,193
CONVEYOR SYSTEM
Marvin H. Anderson, Jr., Hastings, Mich., and Robert Mittermann, Andover, Mass., assignors to Western Electric Company, Incorporated, New York, N.Y., a corporation of New York
Filed Oct. 12, 1962, Ser. No. 230,191
5 Claims. (Cl. 104—88)

This invention relates to conveyor sytems and particularly to conveyor systems having carriers propelled along a main conveyor and automatically delivered to spur line conveyors by selecting devices.

Conveyor systems are widely used in industry to minimize the amount of non-productive material handling involved in the production process. While successfully reducing material handling effort, existing systems fail to realize their full cost reduction potential. For example, despite a considerable expenditure on the physical conveyor system, manual control is sometimes required to direct carriers from the main conveyor to various spur positions. This invention, however, proposes a conveyor system which functions automatically in accordance with predetermined instructions to guide carriers to selected delivery positions. In contradistinction to other arrangements for similar purposes, this system is quite flexible, inexpensive and simple to operate. It may be adapted for a wide range of applications to accomplish a considerable savings in material handling labor.

Accordingly, an object of this invention is a conveyor system wherein carriers are delivered automatically from a main conveyor to spur positions in accordance with predetermined instructions.

Another object of this invention is a novel selecting means compatible with the automatic characteristics of the conveyor system to effectuate the delivery of carriers to designated spur positions.

A more specific object of this invention is a drag line conveyor system wherein masted trucks are delivered automatically from a main conveyor to a faster moving spur conveyor actuated by the same drive means as the main conveyor in accordance with predetermined instructions.

These and other objects of this invention are attained in one illustrative conveyor system wherein a driven main line conveyor has draggers connected to the conveyor and extending downwardly therefrom to engage masted trucks. Spur conveyors driven at a faster speed by the main line conveyor drive means combine with a novel selecting means to effect automatic delivery of trucks onto a predetermined spur or route.

In accordance with other aspects of the invention, the truck mast has a rotatable cylinder provided with a plurality of selector pin positions, a spur mast and, if desired, an escape arrangement. Each delivery position has a selector bar for engaging a particular selector pin in the mast rotating the cylinder so that the spur mast is positioned in the path of a spur dragger which overtakes the main line dragger to effect delivery of the masted truck. The escape feature may be utilized to prevent delivery of the truck to the spur line by repositioning the spur mast of the rotatable cylinder in line with the main conveyor.

Other objects and advantages will become more apparent from the following detailed description when considered in conjunction with the following drawings, wherein:

FIG. 1 is an isometric view of a masted truck guided by a main drag-line conveyor;

FIG. 2 is an isometric view of a rotatable cylinder carried on a truck mast including features for automatic selection of a designated truck;

FIG. 3 is a plan view of a spur line conveyor driven by the main line conveyor illustrating the delivery of masted trucks to designated spur positions; and FIG. 4 is a front view of a truck mast and overhead conveyor system illustrating the selection and escape features of this invention.

Referring to FIGS. 1 and 2 of the drawings, a wheeled truck 11 having a vertically extending mast 12 is automatically propelled along a drag-line conveyor system 13 to a designated spur 16 (shown in FIGS. 3 and 4) by draggers 14 engaging the mast 12. Any suitable drive means such as the motor 36, shown in FIG. 4 for purposes of illustration, may be used to drive the conveyor 13. The motor 36 is affixed to an upper support 51 by means of a bracket 63 and includes a downwardly projecting shaft 64a with a rotary member 39a journaled in a bearing arrangement (not shown) at its lower end. Shafts 64b, 64c and 64d are connected to support 51 and include end located rotary members 39b, 41a and 41b, respectively mounted in anti-friction bearing arrangements 73. A chain 66, best seen in FIG. 3, provided with a series of projecting dogs 38, rides on the outer periphery 74 of members 39a and 39b and engages the main conveyor 13 within a narrow slot defined between a bracket 67 and a plurality of rollers 68. The rollers 68 are supported in a structure 69 and maintain the conveyor 13 in contact with the projecting dogs 38 for driving purposes.

As the motor driven chain 66 rotates, a rotary member 76a mounted in a friction bearing 77 on shaft 64b, best seen in FIG. 3, drives a similar member 76b by means of a belt connection 42, thereby rotating shaft 64c. This imparts rotary movement to member 41a driving chain 78 about member 41b. The projecting dogs 38 of the chain 78 mesh with the spur 16 in a bracket and roller arrangement 79 similar to that previously described for the conveyor 13. In the present instance, this drive system of the caterpillar type takes a 9 to 7 speed ratio from the main drag line 13 to the spur 16. Thus, the spur 16 is driven at a faster rate of speed than the main conveyor 13. Consequently, as will be described later in detail, a properly located spur dragger 23 overtakes the main line dragger 14 at a point where the two are driven alongside one another and removes the truck mast 12 from an open ended dragger 14 by engaging a spur mast 22 which has been rotated into the path of the dragger 23 by the truck selecting means.

In accordance with the invention, each truck mast 12 is provided with a rotatable cylinder 17 having a plurality of selector pin positions 18. A selector pin 19 situated within a given pin position 18 determines the particular spur 16 along which a given truck 11 is to be guided. A spur mast 22 located on the cylinder 17 selectively engages a predetermined one of a plurality of line draggers 23, as seen in FIGS. 3 and 4, in order to accomplish the delivery operation. Both the main line draggers 14 and the spur draggers 23 are rigidly affixed to a chain portion 25 of the respective conveyors 13 and 16 with an upper bifurcated portion 45 having attached rollers 35 riding in a conveyor rail 40 in a well-known manner. An escape lever or levers 24 may be provided on cylinder 17 to prevent truck pickup at a position other than the selected spur 16. In effect, the escape lever 24 furnishes additional delivery locations by permitting pick-up on at least 2 spurs 16 for each setting of the selector pin 19 in the mast 12.

The mast 12 is journaled in upper and lower bearings 26, 27 on the truck 11 and is secured in position by an upper 28 or lower 29 lock of a substantially U-shaped configuration which arrests the movement of a bar 30 connected at right angles to the mast 12. When lowered, the mast 12 rests on a positive stop 31 attached to the truck 11. Means are thereby available to lock the mast 12 in either a raised or lowered position for proper selection and pick-off.

Lowering the mast 12 permits adjustment of the selector pins 19 and escape levers 24 at eye level and also permits the trucks 11 to pass under obstructions. The rotatable cylinder 17 which is mounted on the mast 12 rests on a 180°—2 stop, 3 position cam arrangement 21 wherein cam pin 44, best seen in FIG. 2, engages a sinusoidal end surface 47 of the cylinder 17 when the truck 11 is being guided along conveyor 13. Accordingly, when the cylinder 17 is rotated, the pin 44 moves into one of the two angularly positioned slots 48 on either side of the sinusoidal surface 47. The masts 12 and cylinders 17 are interchangeable on the trucks 11 for purposes of flexibility.

Each delivery position along conveyor 13 has a selector bar 32, seen in FIGS. 3 and 4, which engages a particular selector pin 19 in the mast 12 and rotates the cylinder 17 by 90 degrees as embodied herein. This action positions an upward projecting portion 46 of the spur mast 22 in the path of the spur dragger 23. The selector bar 32 comprises a vertical cylindrical member 49 affixed to an upper supporting surface 51 and a lower adjustable member 52 situated within one end of member 49 and affixed thereto by a lock screw 54. A horizontal portion 56 of member 52 is situated at right angles to member 49 and has an end fixture 53 of rectangular configuration at one end to engage a selector pin 19. The selector bar 32 may be raised or lowered by the lock screw 54 to engage various selector pin positions 18. Similarly an escape bar 33, best seen in FIG. 4, comprises a cylindrical upper member 57 with a downwardly extending member 58 secured therein by a lock screw 59. At the free end is a rectangular fixture 61 with a cutaway section 62 which can be positioned to either engage or miss the escape lever 24 thus increasing the number of potential delivery locations.

In operation, the truck 11 is loaded and the selector pin 19 set for the desired delivery location. The truck 11 is brought to a dispatch point where the mast 12 is caught by a dragger 14 which propels the trucks along the conveyor. As the truck 11 passes various delivery positions, the selector pin 19 misses the selector bar 32 until it reaches the designated location. Thereupon the selector bar 32 hits the pin 19 as shown in FIGS. 3 and 4, rotating the mast cylinder 17 to position the spur mast 22 at right angles to the conveyor 13. The vertical extending portion 46 of the mast 22 is engaged by a spur dragger 23 which at this time is moving parallel to the main conveyor 13 but at a faster speed to effectuate the release of mast 12 from dragger 14. This action is shown in phantom in FIG. 3 while FIG. 4 illustrates the release of the truck 11 from the spur 16 by the slope of the conveyor in region 43. As the dragger 23 ascends the slope, the spur mast 22 becomes disengaged and the truck 11 is left standing in the delivery position. By elevating the spur line 16, delivery can be made at any desired location along the spur.

If the truck 11 is to be switched from the main conveyor 13 to a spur conveyor 16, the escape lever 24 passes through the cutaway portion 62 of the escape bar 33 (FIG. 4), leaving the rotated spur mast 22 in the path of the oncoming spur draggers 23. If the truck is not to be delivered, the escape lever 24 hits the portion 61 of the escape bar 33 rotating the mast cylinder 17, 90° to its original position.

In the example selected for purposes of illustration, the selector pin 19 may be placed in a pin position 18 on either side of the mast 12 depending on whether the delivery location is to the right or left of the main conveyor. The pin 19 may also be placed in any one of six vertical positions while the escape lever 24 may be placed in any one of four vertical positions. By this combination, 48 different switching stations may be reached independently of one another. Furthermore, the number of such stations may be effectively doubled by positioning the mast 12 in either the upper 28 or lower 27 lock for spur pick-off at two levels. With the mast 12 in a lowered position, the spur draggers 23 for the upper level spurs will miss the spur mast 22 and no delivery will occur. The converse is true and delivery will be effected if the mast is properly programmed and situated in a raised position for upper level spurs.

As a further advantage, it is now possible to determine the destination of any truck 11 at a glance by looking at the selector pin 19 and escape lever 24 combination and noting whether that mast 12 is in a raised or lowered position. It must also be emphasized that this invention is not restricted to making deliveries from a main dispatching point to a designated spur, but may be utilized advantageously to make deliveries between spurs 16 and from the spurs to the dispatching location.

It is to be understood that the above described arrangements are simply illustrative of the principles of the invention. Numerous other arrangements may be readily devised by those skilled in the art which will embody the principles of the invention and fall within the spirit and scope thereof.

What is claimed is:

1. A conveyor system having a main overhead dragline conveyor, masted trucks transported by the main conveyor, successive transfer stations associated with the main conveyor and spur conveyors at each of the transfer stations comprising:
    means associated with said spur conveyors, for automatically delivering preselected trucks, and selecting means including
    a rotatable mast cylinder,
    a plurality of pin positions and a spur mast located on the cylinder,
    a selector pin located in a predetermined pin position on the cylinder,
    a selector bar positioned on the overhead conveyor system to engage the selector pin and rotate the cylinder so that the spur mast becomes situated in the path of the spur conveyor,
    an escape lever located in a predetermined pin position on the cylinder, and
    an escape bar positioned on the overhead conveyor system after the selector bar to contact the escape lever repositioning the mast cylinder so that the spur mast misses the spur conveyor where delivery is not desired.

2. A conveyor system in accordance with claim 1 having:
    a projecting element situated on the mast and
    a lower surface of the rotatable cylinder engaging the element comprising
    an undulated cam surface whereon the projecting element rests when the truck is being guided along the main conveyor,
    angularly positioned slots located on both sides of the undulated cam surface to engage and lock the projecting element when the cylinder is rotated for pickup, and
    means located on the mast for positioning said mast cylinder at different predetermined vertical positions thereby to increase the number of delivery stations.

3. In a material handling system including a main overhead drag conveyor, successive transfer stations located along the main conveyor path and masted trucks transportable by the main conveyor and having a main conveyor engaging means, the combination of:
    spur conveyors at each the transfer stations having means for effecting movement of trucks transferred to the spur conveyors from the main conveyor,
    means for operating the spur conveyors at a faster speed than the main conveyor,
    first selecting means at each of the transfer stations,
    a spur conveyor engaging means movably mounted on each of the trucks for transferring the trucks from the main conveyor to the spur conveyor, and second selecting means on each of the trucks for co-operating with the selecting means of the transfer stations to move the spur conveyor engaging means into the path of movement of the spur conveyor truck moving means.

4. A material handling system in accordance with claim 3 wherein:
the cooperating second selecting means further includes:
a rotatable mast cylinder,
a plurality of pin positions on said cylinder,
a selector pin located in a predetermined pin position in said cylinder, and
the first selector means at each transfer station includes:
means to engage the selector pin, rotate the cylinder and position the spur conveyor engaging means in the path of the means for effecting movement of trucks transferred to the spur conveyor for truck delivery purposes.

5. A material handling system in accordance with claim 4 including:
means for releasing trucks from the spur conveyors at predetermined locations by disengaging the means for effecting movement of the trucks transferred to the spur conveyor from the trucks.

References Cited in the file of this patent
UNITED STATES PATENTS

| | | |
|---|---|---|
| 1,792,533 | Francis | Feb. 17, 1931 |
| 2,684,039 | King | July 20, 1954 |
| 2,868,139 | Klamp | Jan. 13, 1959 |
| 2,894,460 | Klamp | July 14, 1959 |
| 2,936,718 | Bradt et al. | May 17, 1960 |
| 2,949,862 | Klamp | Aug. 23, 1960 |